(12) United States Patent
Nawrocki

(10) Patent No.: US 8,801,575 B1
(45) Date of Patent: Aug. 12, 2014

(54) POWERED VEHICLE INTERLOCK SYSTEM

(71) Applicant: Ryszard Nawrocki, Rio Rancho, NM (US)

(72) Inventor: Ryszard Nawrocki, Rio Rancho, NM (US)

(*) Notice: Subject to any disclaimer, the term of this patent is extended or adjusted under 35 U.S.C. 154(b) by 148 days.

(21) Appl. No.: 13/648,490

(22) Filed: Oct. 10, 2012

Related U.S. Application Data

(63) Continuation-in-part of application No. 12/508,432, filed on Jul. 23, 2009, now Pat. No. 8,308,613.

(51) Int. Cl.
*B60W 10/18* (2012.01)

(52) U.S. Cl.
USPC ............ 477/211; 477/186; 477/203; 477/210

(58) Field of Classification Search
USPC .................. 477/186, 203, 205–207, 210, 211
See application file for complete search history.

(56) References Cited

U.S. PATENT DOCUMENTS

| | | | |
|---|---|---|---|
| 3,207,276 A | 9/1965 | David et al. | |
| 4,020,931 A | 5/1977 | Sertori | |
| 4,146,108 A | 3/1979 | Sato | |
| 4,717,207 A * | 1/1988 | Kubota et al. | 303/3 |
| 4,885,960 A | 12/1989 | Maeda et al. | |
| 4,890,686 A | 1/1990 | Hamada et al. | |
| 5,091,857 A | 2/1992 | Katayama et al. | |
| 5,293,976 A | 3/1994 | Naruse | |
| 5,693,927 A | 12/1997 | Wilson | |
| 5,984,429 A * | 11/1999 | Nell et al. | 303/113.4 |
| D425,838 S | 5/2000 | Hussaini | |
| 6,283,240 B1 | 9/2001 | Beever | |
| 6,296,327 B1 | 10/2001 | Linkenbach | |
| 6,388,407 B1 * | 5/2002 | Eguchi | 318/376 |
| 6,547,344 B2 * | 4/2003 | Hada et al. | 303/191 |
| 6,702,718 B2 * | 3/2004 | Tani et al. | 477/203 |
| 6,799,109 B2 * | 9/2004 | Nakamori et al. | 701/54 |
| 6,918,854 B2 | 7/2005 | Okada et al. | |
| 6,919,801 B2 | 7/2005 | Kim | |
| 7,041,030 B2 | 5/2006 | Kuroda et al. | |
| 7,443,116 B2 | 10/2008 | Kutsuna et al. | |
| 2004/0029677 A1 * | 2/2004 | Mori et al. | 477/3 |

* cited by examiner

*Primary Examiner* — Ha D Ho

(57) ABSTRACT

A powered vehicular interlock system includes a powered vehicle with a propulsion means, a final drive means, a braking means, and a vehicle operator's chamber having a floor and a seat. The system includes an automatic transmission, a braking activation interface located close to the floor on the floor first side section, and a propulsion activation interface located close to the floor on a floor second side section. The system includes a propulsion deactivation interlock system having a braking activation sensor, a deactivation module, and a power supply. In a first position, the propulsion deactivation interlock system is adapted to allow the powered vehicle to be propelled. For operation, upon activation of the braking activation interface to a second position, the propulsion deactivation interlock system adapted to prohibit the powered vehicle from being propelled.

17 Claims, 4 Drawing Sheets

POWERED VEHICLE INTERLOCK SYSTEM

CROSS REFERENCE

This application claims priority to U.S. non-provisional application Ser. No. 12/508,432 filed Jul. 23, 2009 as a continuation-in-part, the specification of which is incorporated herein by reference in its entirety.

BACKGROUND OF THE INVENTION

A typical vehicle equipped with an automatic transmission is designed such that a driver operates the vehicle using a single (right) foot. The driver uses his/her right foot to press on an accelerator pedal when he/she needs to accelerate, and when he/she need to brake, he/she moves his/her right foot to press down on a brake pedal. A safety advantage (from reduced response time) can be gained if both feet are used to operate the vehicle so long as the accelerator and brake are not operated simultaneously, thus opposing one another. The present invention features a powered vehicular interlock system.

SUMMARY

The present invention features a powered vehicular interlock system. In some embodiments, the system comprises a powered vehicle comprising a propulsion means, a final drive means, a braking means, and a vehicle operator's chamber having a floor and a seat. In some embodiments, for operation of the powered vehicle, an occupant is located in the seat. In some embodiments, a first foot and a second foot of the occupant are located in front of the seat on the floor.

In some embodiments, the system comprises an automatic transmission operatively connected to the propulsion means. In some embodiments, the automatic transmission is operatively connected to the final drive means. In some embodiments, for operation, the propulsion means propels the powered vehicle via the automatic transmission, via the final drive means. In some embodiments, the automatic transmission automatically selects a ratio between the propulsion means and the final drive means without manual driver input.

In some embodiments, the system comprises a braking activation interface located close to the floor on the floor first side section. In some embodiments, for operation, the braking activation interface is activated via the first foot of the user. In some embodiments, the braking activation interface activates a braking activation assembly. In some embodiments, the braking activation assembly activates a braking means to slow or stop the powered vehicle.

In some embodiments, the system comprises a propulsion activation interface located close to the floor on a floor second side section. In some embodiments, for operation, the propulsion activation interface is activated via the second foot of the user. In some embodiments, the propulsion activation interface activates a prop ion activation assembly. In some embodiments, the propulsion activation assembly activates the propulsion means to propel the powered vehicle.

In some embodiments, the system comprises a propulsion deactivation interlock system having a braking activation sensor, a deactivation module, and a power supply. In some embodiments, in a first position, the propulsion deactivation interlock system is adapted to allow the powered vehicle to be propelled. In some embodiments, for operation, upon activation of the braking activation interface (for slowing or stopping the powered vehicle) via the first foot of the user to a second position of the propulsion deactivation interlock system, the braking activation interface activates the braking activation sensor. In some embodiments, the braking activation sensor activates the deactivation module. In some embodiments, the deactivation module deactivates the propulsion activation assembly. In some embodiments, upon activation of the braking activation interface to a second position, the propulsion deactivation interlock system is adapted to prohibit the powered vehicle from being propelled.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
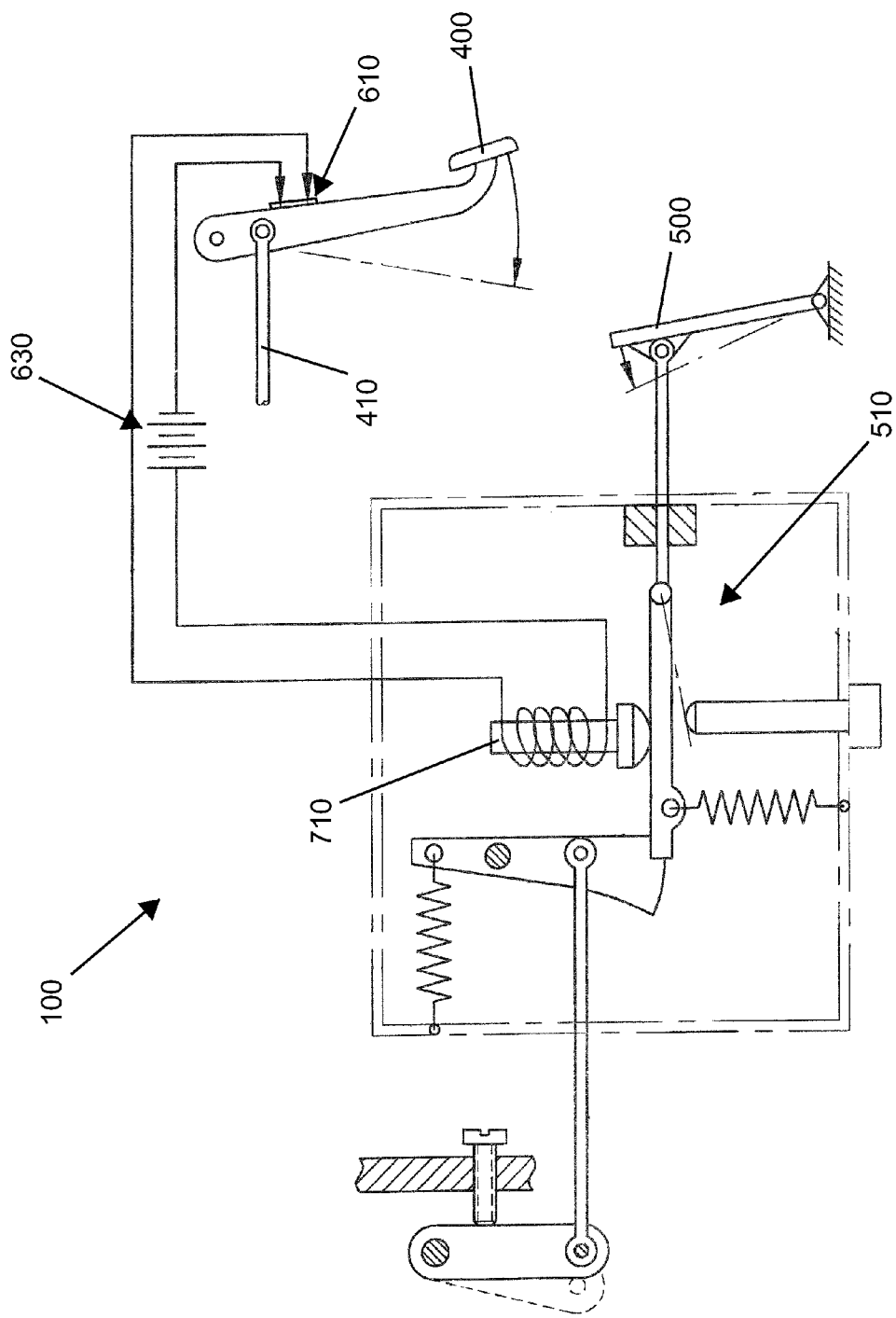
FIG. 1 is a schematic view of the present invention.
Figure 2:
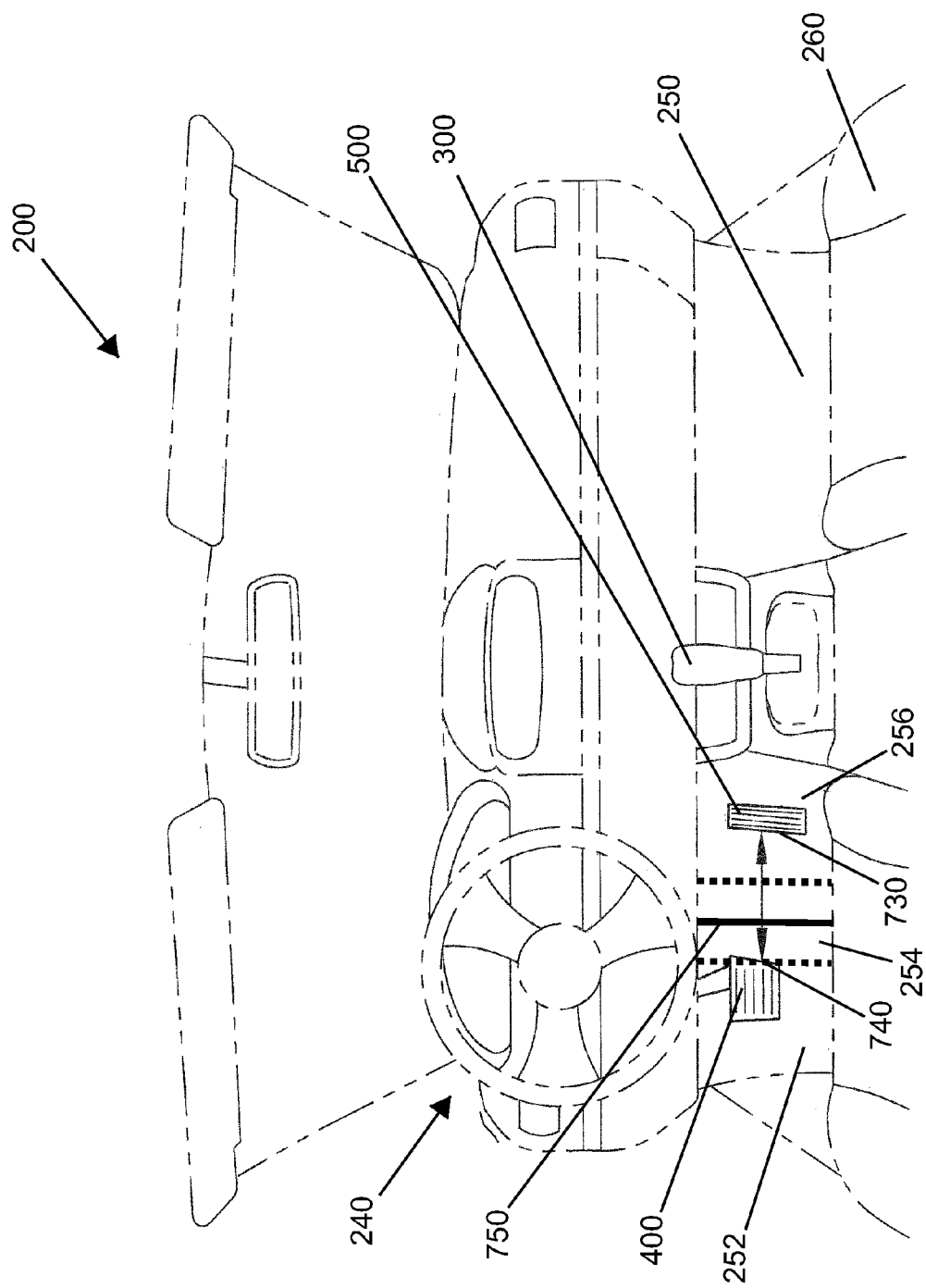
FIG. 2 is a view of the vehicle operator's chamber of the present invention.
Figure 3:
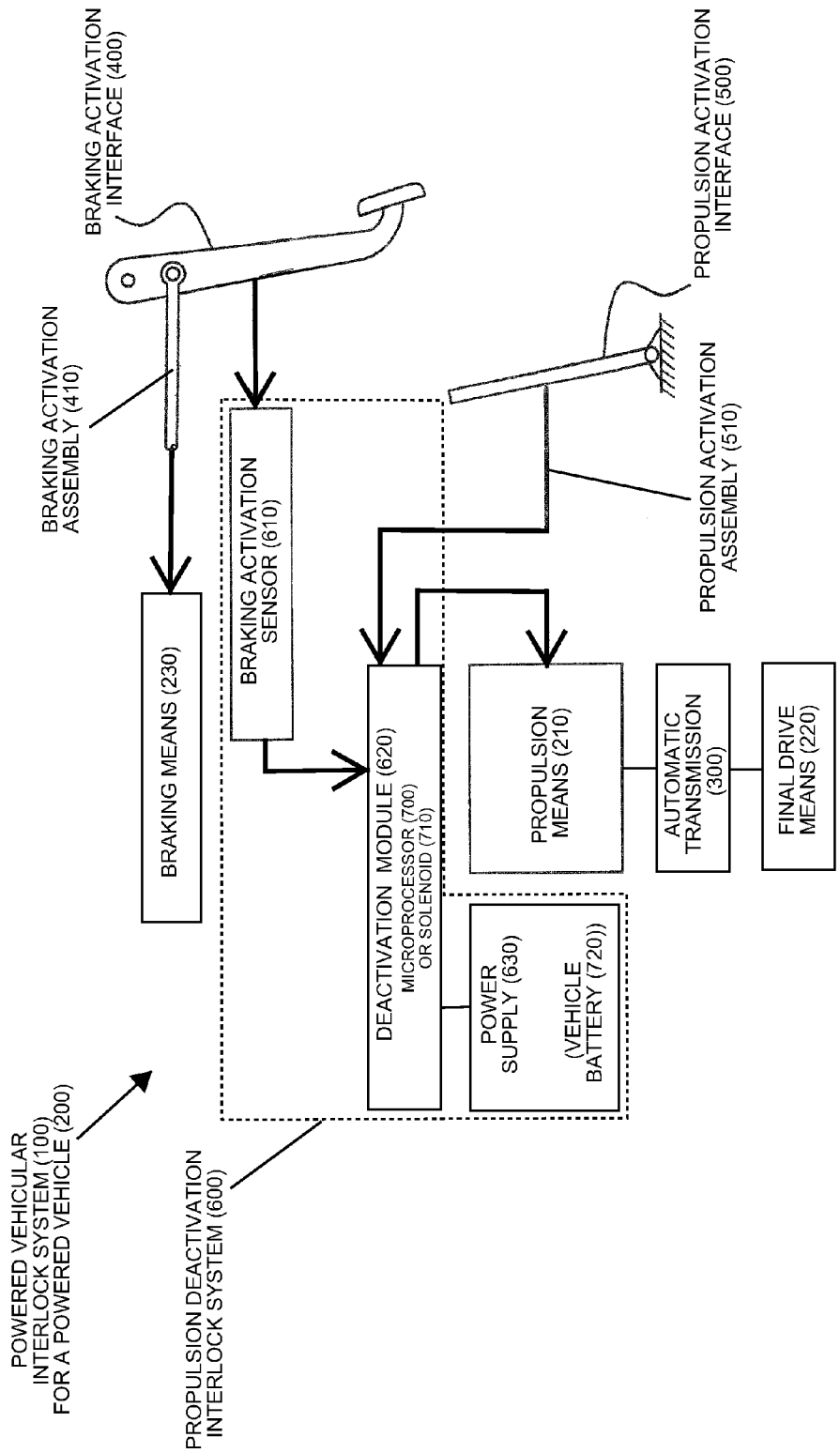
FIG. 3 is a schematic view of the present invention.
Figure 4:
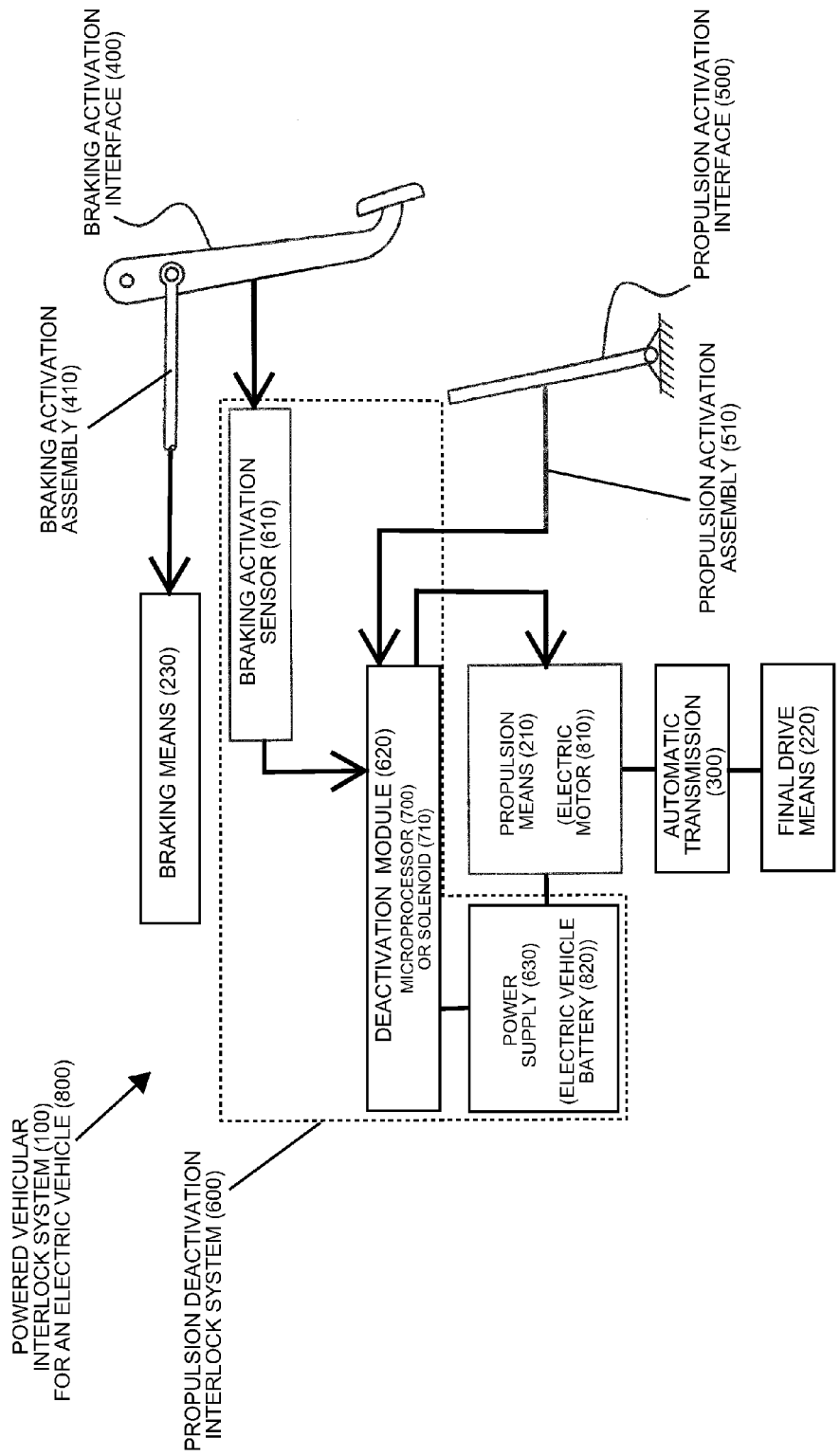
FIG. 4 is a schematic view of an alternate embodiment of the present invention.

Following is a list of elements corresponding to a particular element referred to herein:

100 Powered vehicular interlock system
    200 Powered vehicle
    210 Propulsion means
    220 Final drive means
    230 Braking means
    240 Vehicle operator's chamber
    250 Floor
    252 Floor first side section
    254 Floor middle section
    256 Floor second side section
    260 Seat
    300 Automatic transmission
    400 Braking activation interface
    410 Braking activation assembly
    500 Propulsion activation interface
    510 Propulsion activation assembly
    600 Propulsion deactivation interlock system
    610 Braking activation sensor
    620 Deactivation module
    630 Power supply
    700 Microprocessor
    710 Solenoid
    720 Vehicle battery
    730 Outermost edge of the propulsion interface
    740 Outermost edge of the braking interface
    750 Divider
    800 Electric vehicle
    810 Electric motor
    820 Electric vehicle battery Referring now to FIGS. 1-4, the present invention features a powered vehicular interlock system (100). In some embodiments, the system (100) comprises a powered vehicle (200) comprising a propulsion means (210), a final drive means (220), a braking means (230), and a vehicle operator's chamber (240) having a floor (250) and a seat (260). In some embodiments, the floor (250) of the vehicle operator's chamber (240) comprises a floor first side section (252), a floor middle section (254), and a floor second side section (256). In some embodiments, the propulsion means (210) is a gasoline engine. In some embodiments, the propulsion means (210) is a diesel engine. In some embodiments, the propulsion means (210) is an electric motor. In some embodiments, the propulsion means (210) is an electric motor and gasoline engine.

In some embodiments, for operation of the powered vehicle (200), an occupant is located in the seat (260). In some embodiments, a first foot and a second foot of the occupant are located in front of the seat (260) on the floor (250). In some embodiments, the first foot is located on the floor first side section (252). In some embodiments, the second foot is located on the floor second side section (256). In some embodiments, no foot is located on the floor middle section (254).

In some embodiments, the system (100) comprises an automatic transmission (300) operatively connected to the propulsion means (210). In some embodiments, the automatic transmission (300) is operatively connected to the final drive means (220).

In some embodiments, for operation, the propulsion means (210) propels the powered vehicle (200) via the automatic transmission (300), via the final drive means (220). In some embodiments, the automatic transmission (300) automatically selects a predetermined ratio between a rotation of the propulsion means (210) and a rotation of the final drive means (220) without manual driver input. In some embodiments, the automatic transmission (300) comprises a variable ratio between a rotation of the propulsion means (210) and a rotation of the final drive means (220) without manual driver input.

In some embodiments, the system (100) comprises a braking activation interface (400) located close to the floor (250) in the floor first side section (252). In some embodiments, the braking activation interface (400) is a brake pedal. In some embodiments, the braking activation interface (400) is located where a clutch pedal is typically located close to the floor (250) in the floor first side section (252).

In some embodiments, the braking activation interface (400) is operatively connected to a braking activation assembly (410). In some embodiments, the braking activation assembly (410) is operatively connected to the braking means (230).

In some embodiments, for operation, the braking activation interface (400) is activated via the first foot of the user. In some embodiments, the braking activation interface (400) activates the braking activation assembly (410). In some embodiments, the braking activation assembly (410) activates the braking means (230) to slow or stop the powered vehicle (200).

In some embodiments, the system (100) comprises a propulsion activation interface (500) located close to the floor (250) in a floor second side section (256). In some embodiments, the propulsion activation interface (500) is an accelerator pedal.

In some embodiments, the propulsion activation interface (500) is operatively connected to a propulsion activation assembly (510). In some embodiments, the propulsion activation assembly (510) is operatively connected to the propulsion means (210).

In some embodiments, for operation, the propulsion activation interface (500) is activated via the second foot of the user. In some embodiments, the propulsion activation interface (500) activates the propulsion activation assembly (510).

In some embodiments, the propulsion activation assembly (510) activates the propulsion means (210) to propel the powered vehicle (200).

In some embodiments, the system (100) comprises a propulsion deactivation interlock system (600) having a braking activation sensor (610), a deactivation module (620), and a power supply (630). In some embodiments, the braking activation sensor (610) is located on and operatively connected to the braking activation interface (400). In some embodiments, the braking activation sensor (610) is operatively connected to the deactivation module (620). In some embodiments, the deactivation module (620) is operatively connected to the power supply (630). In some embodiments, the deactivation module (620) is operatively connected to the propulsion activation assembly (510).

In some embodiments, in a first position, the propulsion deactivation interlock system (600) is adapted to allow the powered vehicle (200) to be propelled.

In some embodiments, for operation of the propulsion deactivation interlock system (600), upon activation of the braking activation interface (400) (for slowing or stopping the powered vehicle (200)) via the first foot of the user to a second position, the braking activation interface (400) activates the braking activation sensor (610). In some embodiments, the braking activation sensor (610) activates the deactivation module (620). In some embodiments, the deactivation module (620) deactivates the propulsion activation assembly (510).

In some embodiments, upon activation of the braking activation interface (400) to a second position, the propulsion deactivation interlock system (600) is adapted to prohibit the powered vehicle (200) from being propelled.

In some embodiments, the deactivation module (620) is a microprocessor (700). In some embodiments, the deactivation module (620) is programmed to interrupt an electric signal to prohibit the powered vehicle (200) from being propelled In some embodiments, the deactivation module (620) is a solenoid (710). In some embodiments, the deactivation module (620) is programmed to interrupt an electric signal to prohibit the powered vehicle (200) from being propelled. In some embodiments, the deactivation module (620) is programmed to interrupt the propulsion activation assembly (510) to prohibit the powered vehicle (200) from being propelled.

In some embodiments, the power supply (630) is a direct current power supply (630) from the powered vehicle battery (720). In some embodiments, the powered vehicle battery (720) is a twelve volt battery. In some embodiments, the powered vehicle battery (720) is a six volt battery.

In some embodiments, an outermost edge of the propulsion interface (730) is located at least six inches from an outermost edge of the braking interface (740). In some embodiments, an outermost edge of the propulsion interface (730) is located at least seven inches from an outermost edge of the braking interface (740). In some embodiments, an outermost edge of the propulsion interface (730) is located at least eight inches from an outermost edge of the braking interface (740). In some embodiments, an outermost edge of the propulsion interface (730) is located at least nine inches from an outermost edge of the braking interface (740). In some embodiments, an outermost edge of the propulsion interface (730) is located at least ten inches from an outermost edge of the braking interface (740) In some embodiments, an outermost edge of the propulsion interface (730) is located at least twelve inches from an outermost edge of the braking interface (740).

In some embodiments, a tip of the top of the second foot of the user cannot reach both the propulsion activation interface (500) and the braking activation interface (400) when the back of the bottom of the second foot of the user is located close to the floor (250) in a floor second side section (256).

In some embodiments, the floor middle section (254) comprises a divider (750) located thereon. In some embodiments, the divider (750) is a wall or a partition. In some embodiments, the divider (750) is a hump in the floor (250).

In some embodiments, the braking activation assembly (410) comprises a rod and a lever. In some embodiments, the braking activation assembly (410) comprises a cable.

In some embodiments, the propulsion activation assembly (510) comprises a rod and a lever. In some embodiments, the propulsion activation assembly (510) comprises a cable.

In some embodiments, a powered vehicular interlock system (100) comprises an electric vehicle (200) comprising an electric motor (810), a final drive means (220), a braking means (230), and a vehicle operator's chamber (240) having a floor (250) and a seat (260). In some embodiments, the floor (250) of the vehicle operator's chamber (240) comprises a floor first side section (252), a floor middle section (254), and a floor second side section (256).

In some embodiments, for operation of the electric vehicle (800), an occupant is located in the seat (260). In some embodiments, a first foot and a second foot of the occupant are located in front of the seat (260) on the floor (250). In some embodiments, the first foot is located on the floor first side section (252). In some embodiments, the second foot is located on the floor second side section (256). In some embodiments, no foot is located on the floor middle section (254).

In some embodiments, the system (100) comprises an automatic transmission (300) operatively connected to the electric motor (810). In some embodiments, the automatic transmission (300) is operatively connected to the final drive means (220).

In some embodiments, for operation, the electric motor (810) propels the electric vehicle (800) via the automatic transmission (300), via the final drive means (220). In some embodiments, the automatic transmission (300) automatically selects a predetermined ratio between a rotation of the electric motor (810) and a rotation of the final drive means (220) without manual driver input.

In some embodiments, the system (100) comprises a braking activation interface (400) located close to the floor (250) in the floor first side section (252).

In some embodiments, the braking activation interface (400) is operatively connected to a braking activation assembly (410). In some embodiments, the braking activation assembly (410) is operatively connected to the braking means (230).

In some embodiments, for operation, the braking activation interface (400) is activated via the first foot of the user. In some embodiments, the braking activation interface (400) activates the braking activation assembly (410). In some embodiments, the braking activation assembly (410) activates the braking means (230) to slow or stop the electric vehicle (800).

In some embodiments, the system (100) comprises a propulsion activation interface (500) located close to the floor (250) in a floor second side section (256).

In some embodiments, the propulsion activation interface (500) is operatively connected to a propulsion activation assembly (510). In some embodiments, the propulsion activation assembly (510) is operatively connected to the electric motor (810).

In some embodiments, for operation, the propulsion activation interface (500) is activated via the second foot of the user. In some embodiments, the propulsion activation interface (500) activates the propulsion activation assembly (510). In some embodiments, the propulsion activation assembly (510) activates the electric motor (810) to propel the electric vehicle (800).

In some embodiments, the system (100) comprises a propulsion deactivation interlock system (600) having a braking activation sensor (610), a deactivation module (620), and a power supply (630). In some embodiments, the braking activation sensor (610) is located on and operatively connected to the braking activation interface (400). In some embodiments, the braking activation sensor (610) is operatively connected to the deactivation module (620). In some embodiments the deactivation module (620) is operatively connected to the power supply (630). In some embodiments, the deactivation module (620) is operatively connected to the propulsion activation assembly (510).

In some embodiments, in a first position, the propulsion deactivation interlock system (600) is adapted to allow the electric vehicle (800) to be propelled.

In some embodiments, for operation of the propulsion deactivation interlock system (600), upon activation of the braking activation interface (400) (for slowing or stopping the electric vehicle (800)) via the first foot of the user to a second position, the braking activation interface (400) activates the braking activation sensor (610). In some embodiments, the braking activation sensor (610) activates the deactivation module (620). In some embodiments, the deactivation module (620) deactivates the propulsion activation assembly (510).

In some embodiments, upon activation of the braking activation interface (400) to a second position, the propulsion deactivation interlock system (600) is adapted to prohibit the electric vehicle (800) from being propelled.

In some embodiments, for operation, when the propulsion activation interface (500) is deactivated via the second foot of the user, when the electric motor (810) is not activated to propel the electric vehicle (800), when the electric vehicle (800) is in a coasting mode, the electric motor (810) is adapted to act as a generator for recharging an electric vehicle battery (820).

As used herein, the term "about" refers to plus or minus 10% of the referenced number. For example, an embodiment wherein the propulsion interface is about 10 inches in length includes a propulsion interface that is between 9 and 11 inches in length.

The disclosures of the following U.S. Patents are incorporated in their entirety by reference herein: U.S. Pat. No. 6,296,327 B1; U.S. Pat. No. 6,283,240 B1; U.S. Pat. No. 5,693,927; U.S. Pat. No. 5,293,967; U.S. Pat. No. 4,146,108; and U.S. Pat. No. 4,020,931.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and

What is claimed is:

1. A powered vehicular interlock system (100), wherein said system (100) comprises:
   (a) a powered vehicle (200) comprising a propulsion means (210), a final drive means (220), a braking means (230), and a vehicle operator's chamber (240) having a floor (250) and a seat (260), wherein the floor (250) of the vehicle operator's chamber (240) comprises a floor first side section (252), a floor middle section (254), and a floor second side section (256);
   wherein for operation of the powered vehicle (200), an occupant is disposed in the seat (260), wherein a first foot and a second foot of the occupant are disposed anterior to the seat (260) on the floor (250), wherein the first foot is disposed on the floor first side section (252), wherein the second foot is disposed on the floor second side section (256), wherein no foot is disposed on the floor middle section (254);
   (b) an automatic transmission (300) operatively connected to the propulsion means (210), wherein the automatic transmission (300) is operatively connected to the final drive means (220);
   wherein for operation, the propulsion means (210) propels the powered vehicle (200) via the automatic transmission (300), via the final drive means (220), wherein the automatic transmission (300) automatically selects a predetermined ratio between a rotation of the propulsion means (210) and a rotation of the final drive means (220) without manual driver input;
   (c) a braking activation interface (400) disposed proximal to the floor (250) in the floor first side section (252);
   wherein the braking activation interface (400) is operatively connected to a braking activation assembly (410), wherein the braking activation assembly (410) is operatively connected to the braking means (230);
   wherein for operation, the braking activation interface (400) is activated via the first foot of the user, wherein the braking activation interface (400) activates the braking activation assembly (410), wherein the braking activation assembly (410) activates the braking means (230) to slow or stop the powered vehicle (200);
   (d) a propulsion activation interface (500) disposed proximal to the floor (250) in the floor second side section (256);
   wherein the propulsion activation interface (500) is operatively connected to a propulsion activation assembly (510), wherein the propulsion activation assembly (510) is operatively connected to the propulsion means (210);
   wherein for operation, the propulsion activation interface (500) is activated via the second foot of the user, wherein the propulsion activation interface (500) activates the propulsion activation assembly (510), wherein the propulsion activation assembly (510) activates the propulsion means (210) to propel the powered vehicle (200);
   (e) a propulsion deactivation interlock system (600) having a braking activation sensor (610), a deactivation module (620), and a power supply (630), wherein the braking activation sensor (610) is disposed on and operatively connected to the braking activation interface (400), wherein the braking activation sensor (610) is operatively connected to the deactivation module (620), wherein the deactivation module (620) is operatively connected to the power supply (630), wherein the deactivation module (620) is operatively connected to the propulsion activation assembly (510);
   wherein in a first position, the propulsion deactivation interlock system (600) is adapted to allow the powered vehicle (200) to be propelled;
   wherein for operation of the propulsion deactivation interlock system (600), upon activation of the braking activation interface (400) (for slowing or stopping the powered vehicle (200)) via the first foot of the user to a second position, the braking activation interface (400) activates the braking activation sensor (610), wherein the braking activation sensor (610) activates the deactivation module (620), wherein the deactivation module (620) deactivates the propulsion activation assembly (510);
   wherein upon activation of the braking activation interface (400) to a second position, the propulsion deactivation interlock system (600) is adapted to prohibit the powered vehicle (200) from being propelled.

2. The system (100) of claim 1, wherein the deactivation module (620) is a microprocessor (700).

3. The system (100) of claim 1, wherein the deactivation module (620) is a solenoid (710).

4. The system (100) of claim 1, wherein the power supply (630) is the direct current power supply (630) from a powered vehicle battery (720).

5. The system (100) of claim 1, wherein an outermost edge of the propulsion interface (730) is located at least six inches from an outermost edge of the braking interface (740).

6. The system (100) of claim 1, wherein an outermost edge of the propulsion interface (730) is located at least seven inches from an outermost edge of the braking interface (740).

7. The system (100) of claim 1, wherein an outermost edge of the propulsion interface (730) is located at least eight inches from an outermost edge of the braking interface (740).

8. The system (100) of claim 1, wherein an outermost edge of the propulsion interface (730) is located at least nine inches from an outermost edge of the braking interface (740).

9. The system (100) of claim 1, wherein an outermost edge of the propulsion interface (730) is located at least ten inches from an outermost edge of the braking interface (740).

10. The system (100) of claim 1, wherein an outermost edge of the propulsion interface (730) is located at least twelve inches from an outermost edge of the braking interface (740).

11. The system (100) of claim 1, wherein the floor middle section (254) comprises a divider (750) disposed thereon.

12. The system (100) of claim 1, wherein the braking activation assembly (410) comprises a rod and a lever.

13. The system (100) of claim 1, wherein the braking activation assembly (410) comprises a cable.

14. The system (100) of claim 1, wherein the propulsion activation assembly (510) comprises a rod and a lever.

15. The system (100) of claim 1, wherein the propulsion activation assembly (510) comprises a cable.

16. A powered vehicular interlock system (100), wherein said system (100) comprises:
   (a) an electric vehicle (200) comprising an electric motor (810), a final drive means (220), a braking means (230), and a vehicle operator's chamber (240) having a floor (250) and a seat (260), wherein the floor (250) of the vehicle operator's chamber (240) comprises a floor first side section (252), a floor middle section (254), and a floor second side section (256);
   wherein for operation of the electric vehicle (800), an occupant is disposed in the seat (260), wherein a first foot and a second foot of the occupant are disposed anterior to the seat (260) on the floor (250), wherein the first foot is disposed on the floor first side section (252), wherein the second foot is disposed on the floor second side section (256), wherein no foot is disposed on the floor middle section (254);

(b) an automatic transmission (300) operatively connected to the electric motor (810), wherein the automatic transmission (300) is operatively connected to the final drive means (220);

wherein for operation, the electric motor (810) propels the electric vehicle (800) via the automatic transmission (300), via the final drive means (220), wherein the automatic transmission (300) automatically selects a predetermined ratio between a rotation of the electric motor (810) and a rotation of the final drive means (220) without manual driver input;

(c) a braking activation interface (400) disposed proximal to the floor (250) in the floor first side section (252);

wherein the braking activation interface (400) is operatively connected to a braking activation assembly (410), wherein the braking activation assembly (410) is operatively connected to the braking means (230);

wherein for operation, the braking activation interface (400) is activated via the first foot of the user, wherein the braking activation interface (400) activates the braking activation assembly (410), wherein the braking activation assembly (410) activates the braking means (230) to slow or stop the electric vehicle (800);

(d) a propulsion activation interface (500) disposed proximal to the floor (250) in a floor second side section (256);

wherein the propulsion activation interface (500) is operatively connected to a propulsion activation assembly (510), wherein the propulsion activation assembly (510) is operatively connected to the electric motor (810);

wherein for operation, the propulsion activation interface (500) is activated via the second foot of the user, wherein the propulsion activation interface (500) activates the propulsion activation assembly (510), wherein the propulsion activation assembly (510) activates the electric motor (810) to propel the electric vehicle (800);

(e) a propulsion deactivation interlock system (600) having a braking activation sensor (610), a deactivation module (620), a power supply (630), wherein the braking activation sensor (610) is disposed on and operatively connected to the braking activation interface (400), wherein the braking activation sensor (610) is operatively connected to the deactivation module (620), wherein the deactivation module (620) is operatively connected to the power supply (630), wherein the deactivation module (620) is operatively connected to the propulsion activation assembly (510);

wherein in a first position, the propulsion deactivation interlock system (600) is adapted to allow the electric vehicle (800) to be propelled;

wherein for operation of the propulsion deactivation interlock system (600), upon activation of the braking activation interface (400) (for slowing or stopping the electric vehicle (800)) via the first foot of the user to a second position, the braking activation interface (400) activates the braking activation sensor (610), wherein the braking activation sensor (610) activates the deactivation module (620), wherein the deactivation module (620) deactivates the propulsion activation assembly (510);

wherein upon activation of the braking activation interface (400) to a second position, the propulsion deactivation interlock system (600) is adapted to prohibit the electric vehicle (800) from being propelled.

17. The system of claim 16, wherein for operation, when the propulsion activation interface (500) is deactivated via the second foot of the user, wherein when the electric motor (810) is not activated to propel the electric vehicle (800), wherein when the electric vehicle (800) is in a coasting mode, the electric motor (810) is adapted to act as a generator for recharging an electric vehicle battery (820).

\* \* \* \* \*